E. I. PEARSON.
SPECIFIC GRAVITY CONTROL FOR ELECTRIC CIRCUITS.
APPLICATION FILED NOV. 10, 1919.
1,412,959.
Patented Apr. 18, 1922.
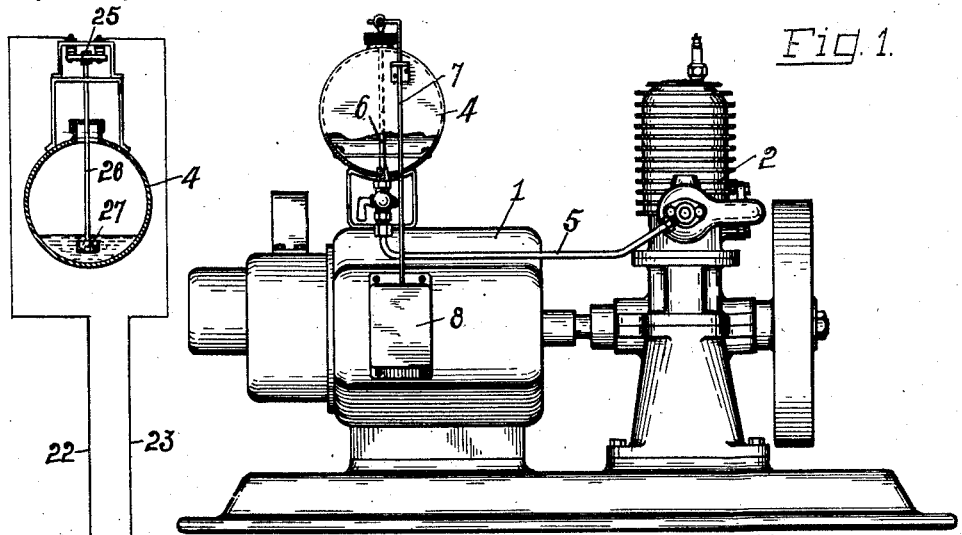
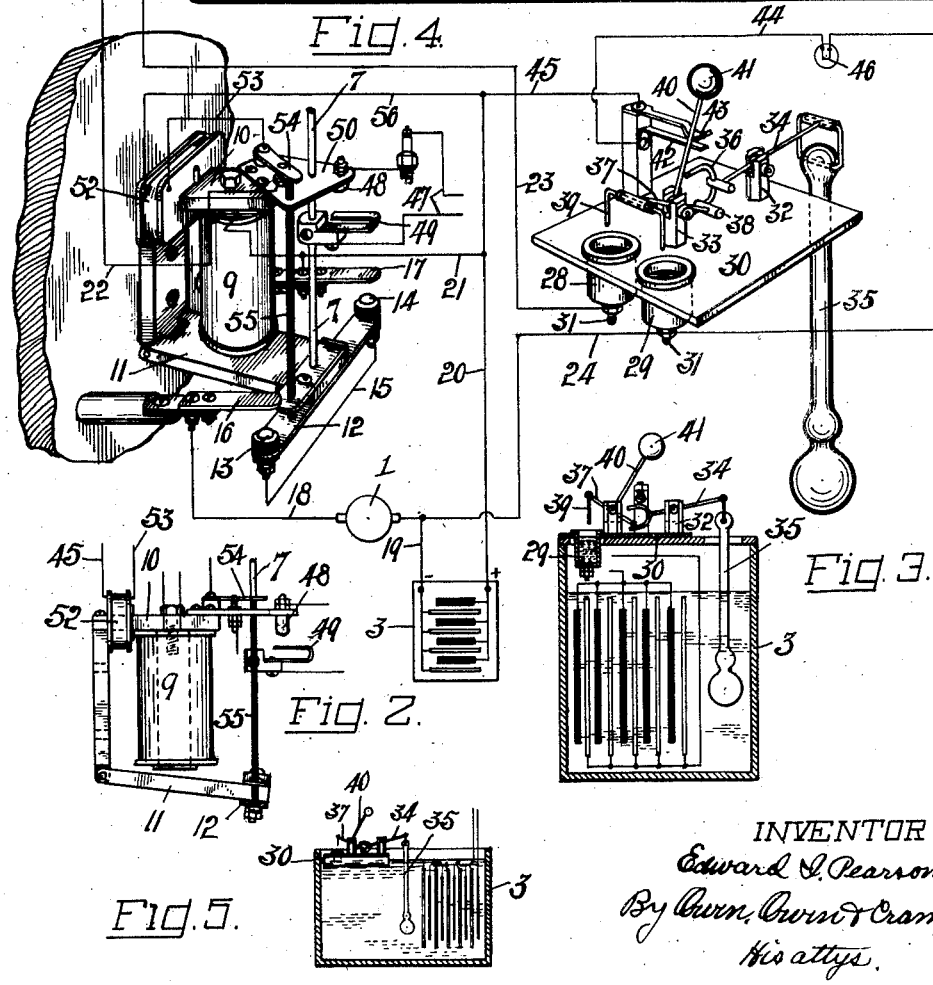
INVENTOR
Edward I. Pearson,
By Burn, Burn & Crampton,
His attys.

UNITED STATES PATENT OFFICE.

EDWARD I. PEARSON, OF TOLEDO, OHIO.

SPECIFIC-GRAVITY CONTROL FOR ELECTRIC CIRCUITS.

1,412,959. Specification of Letters Patent. Patented Apr. 18, 1922.

Application filed November 10, 1919. Serial No. 337,017.

*To all whom it may concern:*

Be it known that I, EDWARD I. PEARSON, a citizen of the United States, and a resident of Toledo, in the county of Lucas and State of Ohio, have invented a certain new and useful Specific-Gravity Control for Electric Circuits; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to battery generator units and to those in which the generator is driven by an internal combustion engine.

The primary object of my invention is the provision of improved means which is automatically operable by predetermined changes in the specific gravity of the electrolyte of an electric battery to open or close an electric circuit.

A specific object of my invention is the provision of improved automatically operable means, controlled, at proper periods, by the specific gravity of a battery for starting and stopping a charging means for the battery, whereby the specific gravity of the electrolyte is kept within an efficient range to insure an even output from the battery and to consequently prolong the life of the battery.

A further specific object of my invention is the provision of means in connection with the internal combustion engine of a generator unit of the class described whereby the supply of liquid fuel to the engine is controlled by the specific gravity of the battery electrolyte.

A further specific object of my invention is the provision of means in connection with the internal combustion engine of a generator unit of the class described whereby a switch in the ignition circuit of the engine is automatically closed and opened by reason of the fluctuations of the specific gravity of the battery electrolyte.

A further specific object of the invention is the provision, in a battery charging unit of the class described, of means automatically controlled by the specified gravity of the battery electrolyte to close the generator circuit, to cause it to act as a motor, to crank or start the associated engine when the specific gravity of the electrolyte has been lowered a predetermined extent.

A further object of the invention is the provision, in a battery charging unit of the class described, of means which is automatically operable to prevent an operation of the generator when the liquid fuel for running the generator driving engine has been lowered a predetermined extent, thereby preventing the generator from exhausting the battery by running as a motor to crank the engine when the liquid fuel has become exhausted.

Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 1 is a side elevation of a generator unit, excepting the battery, embodying the invention. Fig. 2 is a side elevation of the magnet armature and associated parts of the control means embodying the invention, with a part in section. Fig. 3 is a vertical sectional view of a battery with a hydrometer operated switch mounted thereon. Fig. 4 is a diagrammatical view of the generator unit with parts of the means embodying the invention in enlarged perspective, and Fig. 5 is a vertical section of a battery with the hydrometer operated switch mounted on a float resting on the electrolyte.

Referring to the drawings, 1 designates the generator, 2 the driving motor therefor of the internal combustion type, and 3 the battery of a charging unit with which the control means embodying the invention is associated. Liquid fuel is supplied to the engine 2 from a tank 4 having communication with the engine carburetor through a pipe 5. The pipe 5 at the end thereof within the tank is provided with a valve seat against which a needle form of valve 6 is adapted to seat to close the communication between the tank and engine. The valve 6, in the present instance, has its stem extending up through the top of the tank 4 and provided with an eye for loosely receiving the angled end of a rod 7, which is mounted for vertical reciprocatory movements and is operable, as hereinafter described, to seat or unseat the needle valve.

Mounted on the side of the generator 1 within a housing 8, in the present instance, is an electromagnet 9, which, in the present instance, is suspended at its upper end from an arm or bracket 10 projecting from the generator casing. An armature 11 hingedly projects from the generator casing below the magnet 9 in position to be drawn upward from its normal lowered position upon an energizing of the magnet. The armature is provided at its outer end with a cross or keeper bar 12 having contacts 13 and 14 at its opposite ends which are electrically connected, as by a wire 15. When the armature 11 is raised from its normal position the contacts 13 and 14 make contact, respectively, with spring contact fingers 16 and 17 disposed thereover. The contact 16 is connected by a lead 18 through the generator 1 and through a lead 19 to one side of the battery 3. The other side of the battery 3 is connected by leads 20 and 21 to the contact 17 so that the armature 11 serves as the movable member of a switch for opening or closing the generator circuit.

A mercury switch is interposed between the leads 23 and 24 of the magnet circuit and has the two pots 28 and 29 carried by a plate 30 and containing mercury with which said leads are respectively in electrical connection through conductor posts 31 in the bottoms of the pots, or in any other suitable manner. The plate 30, if the mercury switch is of the non-floating type hereinafter described, is mounted on the top of the battery 3 or in suitable adjacent relation thereto and has the two posts 32 and 33 rising therefrom. The post 32 has a lever 34 fulcrumed to its top for vertical rocking with one end projecting beyond an edge of the plate 30, in the present instance, and having a hydrometer 35 pivotally suspended therefrom in position to lower into the electrolyte of the battery to float therein, the depth or extent of immersion of the hydrometer depending on the specific gravity of the liquid, as is well understood in the use of instruments of this class. The opposite end of the lever 34 is provided with a yoke 36, the arms of which are vertically spaced and project longitudinally of the lever. A lever 37 is fulcrumed to the upper end of the post 33 and has at one end a cross arm or angled end 38 projecting within the yoke 36 whereby the lever 37 may be rocked by predetermined movements of the lever 34. A U-shaped switch member 39 is swingingly suspended from its center or loop portion from the end of the lever 37 opposed to that engaged by the lever 34 and the arms of the switch member are suspended over and intended to be lowered into the mercury in the respective pots 28 and 29 upon a downward rocking of the associated end of the lever 37, as is apparent, thereby bridging the gap between the leads 23 and 24. The lever 37 has an arm 40 projecting upward from its fulcrum at right angles to the lever and provided at its upper end with a weight 41, which, upon a rocking of the lever, swings to one side or the other of a vertical line intersecting the lever fulcrum. The purpose of this weighted arm is to effect a quick circuit breaking or making movement of the lever 37 when being moved by the lever 34. The purpose of the yoke 36 on the lever 34 is to allow said lever and the hydrometer 35 to have a predetermined range of movement without effecting the movement of the lever 37 and also to permit a quick movement of the lever 37 relative to that of the lever 34 when the lever 37 is being moved by the gravity action of the weight 41 to either open or close the circuit in which its switch member 39 is disposed.

Should the electrolyte in the battery 31, by reason of evaporation or otherwise, become lowered to a point where it should be replenished, the increased movement which the lever 34 is caused to have by reason of the greater lowering of the hydrometer 35 will cause the yoke end of the lever to raise into engagement with and move a spring finger 42 up into circuit closing contact with a finger 43, thereby closing a signal circuit in which said fingers are disposed. In the present instance, the finger 42 is connected by a lead 44 to the lead 24 which is in permanent connection with one side of the battery, and the finger 43 is connected by a lead 45 to the lead 20, which is in permanent connection with the other side of the battery. The lead 44 has a signal device 46 which may comprise a light, bell or other suitable electrically operated signaling means.

The ignition circuit 47 of the engine 2 has a switch disposed therein of which 48 is the stationary contact member and 49 the movable contact member. The stationary member 49 is carried by an arm 50 projecting from the bracket arm 10 and the movable member 49 is carried in subjacent relation to the contact member 48 by the vertically movable rod 7, which projects through an opening in the arm 50 and is guided thereby and has its lower end connected to the outer or free end portion of the armature 11 for vertical movements therewith. It is thus evident that when the armature 11 is in its lowered or normal position the switch member 49 will stand lowered with respect to the member 48, maintaining the ignition circuit 47 open, and when the armature is raised by an energizing of the magnet, the switch member 49 will be raised to make contact with the member 48 and close the ignition circuit.

52 designates a shunt coil of lower resistance than the magnet coil 9 and in magnetizing relation to its core. One end of the coil 52 is in connection with the lead 13

22 through a lead 53 having a normally closed switch therein. The movable member of this switch comprises a spring contact finger 54, which is engaged by and moved out of its normal circuit closing position by the movement in one direction of a rod 55. This rod projects through and is guided by the arm 50 and has its lower end connected to the outer end of the armature 11 for movements therewith so that a movement of the armature under the influence of the magnet will effect a raising of the rod 55 and a consequent lifting of the spring finger 54 and breaking of the shunt coil circuit. The other end of the shunt coil 52 is connected by a lead 56 to the battery lead 20. The purpose of the shunt coil 52 is to increase the strength of the electromagnet during its raising pull on the armature 11, said coil being thrown out of circuit when the armature has been raised, thus leaving the main coil 9 to sustain the armature load. It is evident that this shunt coil may be used or not depending on whether or not the coil 9 is of sufficient strength in itself to impart the desired initial movement to the armature.

In the form of the invention above described, the hydrometer operated switch is referred to as mounted on a plate 30 that is stationary with respect to the battery. It is evident with this form that the accuracy of opening and closing of the switch with respect to the specific gravity of the electrolyte will be uniform if the electrolyte is maintained at approximately the same level in the battery, but will vary as the height of the electrolyte varies. It is therefore apparent that a more accurate operation of the device can be obtained by adapting the plate 30 to float on the surface of the electrolyte so that the position of the plate with respect to the surface of the electrolyte will remain constant, as illustrated in Fig. 5.

The automatic operation of a battery generating plant equipped with my invention is as follows:—

As the specific gravity in the battery electrolyte lowers the hydrometer 35 will lower therein and when the hydrometer has lowered a predetermined distance or to a point where it is desired to recharge the electrolyte, the lever 34 will have moved a sufficient extent to move the lever 37 and swing its weight 41 past center, whereupon such weight will act to quickly lower the arms of the switch member 39 into the mercury in the respective pots 28 and 29, thereby closing the battery electromagnet circuit 20, 21, 22, 23, 24 and 19. Said circuit will not, however, be closed if the liquid in the tank 4 is so low that the float operated switch member 25 is lowered from bridging connection with leads 22 and 23. Upon a closing of the magnet circuit the energizing of the magnet causes a raising of the armature 11 which in turn raises the switch means 13, 14, 15 to bridge the gap between the contacts 16 and 17 and close the generator circuit 18, 19, 20 and 21. The raising of the armature 11 at the same time raises the rod 7 and moves the switch member 49 into engagement with the contact 48 to close the engine ignition circuit 47 and also lifts the needle valve 6 in the tank 4 from its seated position, thereby permitting a flow of operating fluid from said tank to the engine. The closing of the generator circuit 18, 19, 20 and 21 causes the generator 1 to act as a motor, receiving its operating current from the battery 3 and to drive the engine 2 to start the same, after which the generator is driven by the engine and acts to recharge the battery. When the specific gravity of the battery electrolyte has been raised a predetermined extent by the recharging operation, the hydrometer 35 will have raised a sufficient extent in the electrolyte to move the lever 37 to place its weight 41 past center so that such weight will then act to quickly throw said lever to withdraw the switch member 39 from the mercury and open the electromagnet circuit, thus permitting the armature 11 to lower and open the generator circuit and also open the ignition circuit and lower the needle valve to seating position. If the electromagnet is provided with a shunt coil 52, as illustrated, a raising of the armature 11 will operate the rod 55 to move the switch member 54 to open position thereby throwing the shunt coil out of operation.

It is evident that I have provided an automatic control means for use in connection with battery generating plants of the internal combustion engine driven type whereby the plant needs no attention on the part of an attendant or operator except to replenish the electrolyte fluid in the tank 4 to keep the float 27 and its switch member 25 in raised position. The importance of a control of this type, the operation of which, to make and close an electric circuit, is dependent on the specific gravity of the battery electrolyte, is readily apparent to persons skilled in the use of electric batteries, as uniform cycles of charging and discharging of the battery are thereby maintained, which adds materially to the life of a battery over one in which the charging and discharging cycles are of an irregular nature, such as must necessarily be the case when the control is dependent on the voltage of the battery instead of on the specific gravity of its electrolyte or when the control is manual instead of automatic.

I wish it understood that my invention is not limited to any specific construction, arrangement, or form of the parts, or to the use of the control in connection with a battery generating set, as it is capable of numerous modifications and changes and of use in different connections without departing from the spirit of the invention as defined in the claims.

Having thus described my invention, what I claim as new, and desire to secure by Letters Patent, is,—

1. In a battery generator set, an electric battery having a liquid electrolyte, a generator in circuit with the battery, an internal combustion engine for driving the generator, a normally open switch in the generator circuit, an electromagnet operable when energized to close said switch and having a shunt coil which is automatically thrown out of circuit when said switch is closed, a switch in the electromagnet circuit, and means automatically operable to close the electric magnet circuit switch upon a predetermined lowering of the specific gravity of the electrolyte and to open said latter switch upon a raising of the specific gravity of the electrolyte.

2. In a battery generating set, an electric battery having a liquid electrolyte, a hydrometer floating in the electrolyte, a generator in circuit with the battery, an internal combustion engine for driving the generator, a liquid fuel supply tank in communication with the engine, a float in said tank, a normally open switch in the generator circuit, an electromagnet operable when energized to move said switch to close its circuit, the electromagnet circuit having two switches therein, one retained in closed position by the float when a predetermined quantity of liquid fuel is in the supply tank and the other being connected to the hydrometer and closed and opened by movements thereof occasioned by a predetermined lowering or raising respectively of the specific gravity of the electrolyte.

3. In a battery generator set, an electric battery having a liquid electrolyte, a generator in circuit with the battery, a control circuit for the generator circuit, an internal combustion engine for driving the generator, a liquid fuel supply container for the engine, a float in the container, a switch in the control circuit and retained closed by the float when the fluid is above a predetermined level in the container, a second normally open switch in the generator circuit, and means automatically operable to close the second switch upon a predetermined lowering of the specific gravity of the electrolyte and vice versa.

4. In a battery generator set, an electric battery having a liquid electrolyte, a generator in circuit with the battery, a control circuit for the generator circuit, an internal combustion engine for driving the generator, a liquid fuel supply container for the engine, a float in the container, a switch in the control circuit and retained closed by the float when the fuel is above a predetermined level in the container, a second normally open switch in the generator circuit, an electromagnet operable when energized to close said second switch, and means automatically operable to energize the electromagnet upon a predetermined lowering of the specific gravity of the electrolyte.

In testimony whereof, I have hereunto signed my name to this specification.

EDWARD I. PEARSON.